US012172228B2

(12) United States Patent
Miyawaki et al.

(10) Patent No.: US 12,172,228 B2
(45) Date of Patent: Dec. 24, 2024

(54) FRICTION STIR WELDING DEVICE

(71) Applicant: HONDA MOTOR CO., LTD., Tokyo (JP)

(72) Inventors: Akiyoshi Miyawaki, Saitama (JP); Mitsuru Sayama, Saitama (JP); Taichi Kurihara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 18/189,228

(22) Filed: Mar. 24, 2023

(65) Prior Publication Data

US 2023/0311241 A1 Oct. 5, 2023

(30) Foreign Application Priority Data

Mar. 31, 2022 (CN) .......................... 202210346120.1

(51) Int. Cl.
*B23K 20/12* (2006.01)
(52) U.S. Cl.
CPC ........ *B23K 20/1255* (2013.01); *B23K 20/126* (2013.01)
(58) Field of Classification Search
CPC .. B23K 20/1255; B23K 20/126; B23K 20/26; B23K 37/003; B23K 20/1245; B23K 20/122–128
USPC ................................ 228/112.1, 2.1, 222, 46
See application file for complete search history.

(56) References Cited

U.S. PATENT DOCUMENTS

| 10,661,379 | B1 * | 5/2020 | Larsson | ................. | B23K 37/08 |
| 2004/0134971 | A1 * | 7/2004 | Narita | ................. | B23K 20/1235 |
| | | | | | 228/112.1 |
| 2010/0038832 | A1 * | 2/2010 | Rosal | ................. | B23K 20/1255 |
| | | | | | 228/2.1 |
| 2017/0266755 | A1 * | 9/2017 | Katoh | ................. | F16C 19/30 |
| 2017/0266756 | A1 * | 9/2017 | Katoh | ................. | B23K 20/1255 |
| 2019/0061048 | A1 * | 2/2019 | Fleck | ................. | B23K 20/1255 |
| 2020/0376590 | A1 | 12/2020 | Weigl et al. | | |
| 2023/0014926 | A1 * | 1/2023 | Miyawaki | ............. | B23K 11/115 |
| 2023/0019177 | A1 * | 1/2023 | Miyawaki | ............. | B23K 11/11 |
| 2023/0356322 | A1 * | 11/2023 | Haynie | ................. | B33Y 10/00 |

FOREIGN PATENT DOCUMENTS

| CN | 111761198 A | * | 10/2020 | ......... B23K 20/1245 |
| EP | 1716959 B1 | * | 3/2011 | ........... B23K 20/125 |
| JP | 2019516555 A | | 6/2019 | |
| KR | 20200046465 A | * | 5/2020 | |

* cited by examiner

*Primary Examiner* — Kiley S Stoner
(74) *Attorney, Agent, or Firm* — CKC & Partners Co., LLC

(57) ABSTRACT

A friction stir welding device includes: a probe capable of pressing a welding target part of a workpiece while rotating; a shoulder externally surrounding an outside of the probe, on a plane intersecting a rotation axis of the probe; a shoulder attachment member provided with the shoulder; and a flow path formed at a contact part between the shoulder and the shoulder attachment member and adapted to allow a cooling medium to flow therethrough.

5 Claims, 13 Drawing Sheets

FRICTION STIR WELDING DEVICE

This application is based on and claims the benefit of priority from Chinese Patent Application No. CN202210346120.1, filed on 31 Mar. 2022, the content of which is incorporated herein by reference.

BACKGROUND OF THE INVENTION

Field of the Invention

The present invention is related to a friction stir welding device.

Related Art

In recent years, research and development have been carried out in relation to weight reduction that can contribute to improvement of energy efficiency, in order to ensure that more people have access to affordable, reliable, sustainable, and advanced energy. Conventionally, to reduce the weight of a vehicle body of an automobile or the like while maintaining rigidity of the vehicle body, components of the vehicle body are welded by friction stir welding.

Japanese Unexamined Patent Application (Translation of PCT Application), Publication No. 2019-516555 discloses a device that melts and joins two elements to be welded together, by performing a friction stir melt/join procedure. The device includes: a melt/join head that can be integrated with an arbitrary machine, is in the form of a spindle drive driven by a drive unit, and has an assembly flange for fixing a device that assists a melt/join process; and a clamping system for receiving a tool cover having a melt/join/smoothing shoe for guiding a melt/join pin.

Patent Document 1: Japanese Unexamined Patent Application (Translation of PCT Application), Publication No. 2019-516555

SUMMARY OF THE INVENTION

The present inventors discovered that the device described in Patent Document 1 has the following disadvantage. With the device described in Patent Document 1, at the time of melting/joining the two elements to be welded together, heat is generated in the surroundings of the melt/join pin and the melt/join/smoothing shoe. For this reason, according to this technique related to weight reduction, there is a possibility that the device and the elements to be welded may adhere to each other.

It is an object of the present invention to provide a friction stir welding device capable of inhibiting adhesion that may be caused by heat generated at the time of welding. Further, the invention will, as a result, contribute to improvement of energy efficiency.

(1) The present invention includes: a probe capable of pressing a welding target part of a workpiece while rotating; a shoulder externally surrounding the probe, on a plane intersecting a rotation axis of the probe; a shoulder attachment member provided with the shoulder; and a flow path formed at a contact part between the shoulder and the shoulder attachment member and adapted to allow a cooling medium to flow therethrough.

(2) In the present invention, in (1) above, the flow path may be a recessed part formed in the shoulder attachment member at the contact part between the shoulder and the shoulder attachment member.

(3) In the present invention, in (1) above, the flow path may be a recessed part formed in the shoulder at the contact part between the shoulder and the shoulder attachment member.

(4) In the present invention, in any one of (1) to (3) above, the shoulder and the shoulder attachment member may be in tapered contact at the contact part between the shoulder and the shoulder attachment member.

(5) In the present invention, in any one of (1) to (4) above, an inlet of the flow path may be positioned higher than an outlet of the flow path.

(6) In the present invention, in any one of (1) to (5) above, a support table configured to support the workpiece may be provided and, in a state in which the workpiece is sandwiched between the shoulder and the support table, the shoulder and the support table may serve as electrodes, and an electric current may be caused to flow between the shoulder and the support table.

(7) In the present invention, in (6) above, the support table may have a curved surface for supporting the workpiece and may have a cooling medium path through which a cooling medium for cooling the support table is caused to flow, and the cooling medium path may be configured so as to cool a part of the support table corresponding to the probe.

The present invention makes it possible to provide a friction stir welding device capable of inhibiting the adhesion that may be caused by the heat generated at the time of welding.

DETAILED DESCRIPTION OF THE INVENTION

The following will describe specific embodiments of the present invention in detail, with reference to the drawings.

Figure 1:
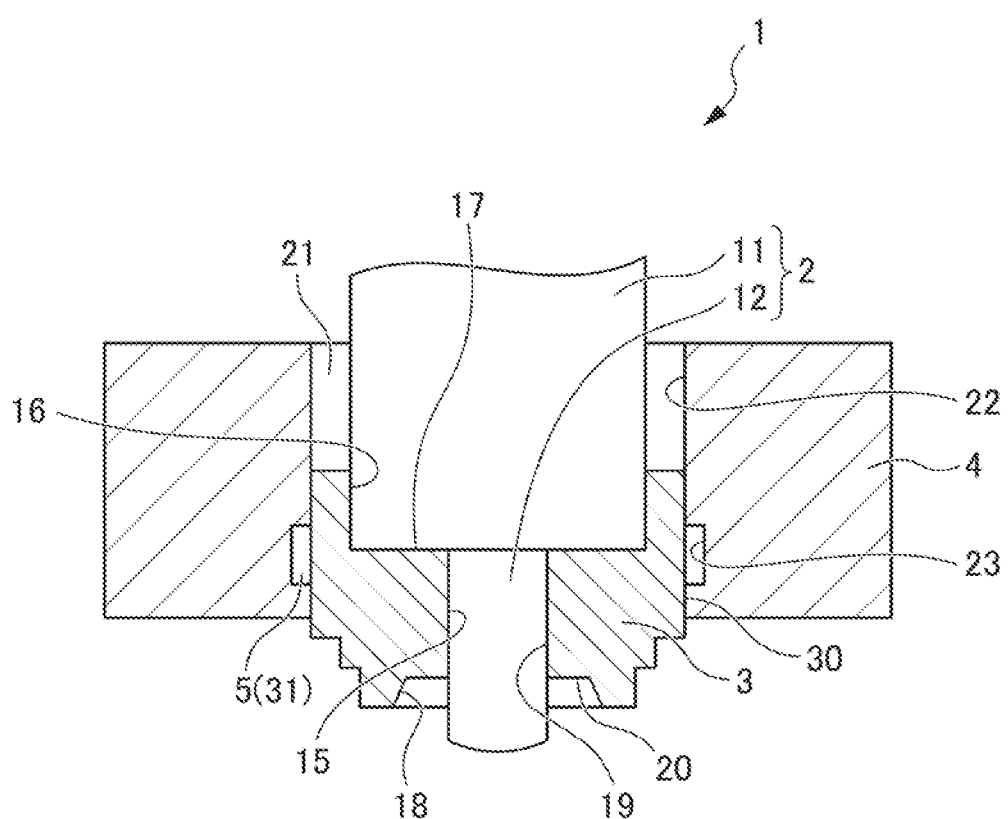
FIG. 1 is a front view illustrating a friction stir welding device according to a first embodiment of the present invention, partially shown in cross section.
Figure 2:
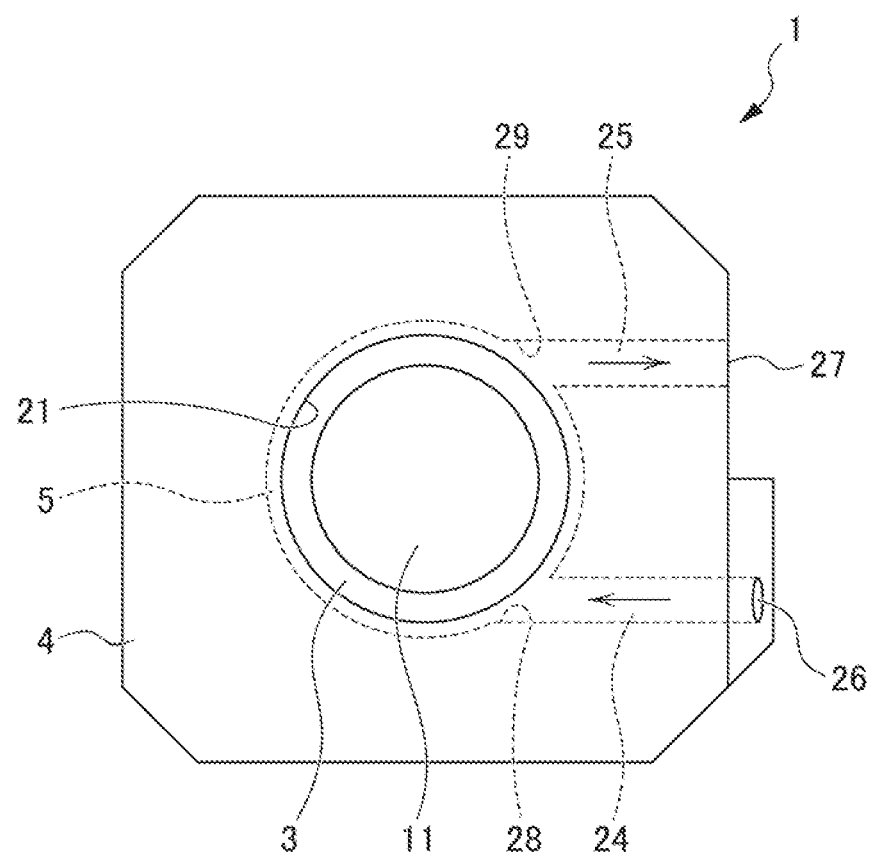
FIG. 2 is a plan view illustrating the friction stir welding device according to the first embodiment of the present invention.
Figure 3:
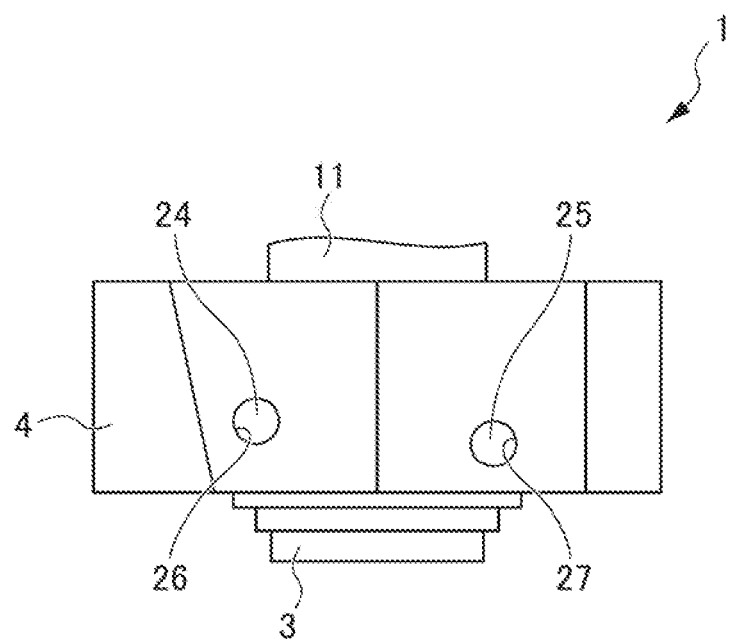
FIG. 3 is a side view illustrating the friction stir welding device according to the first embodiment of the present invention.
Figure 4:
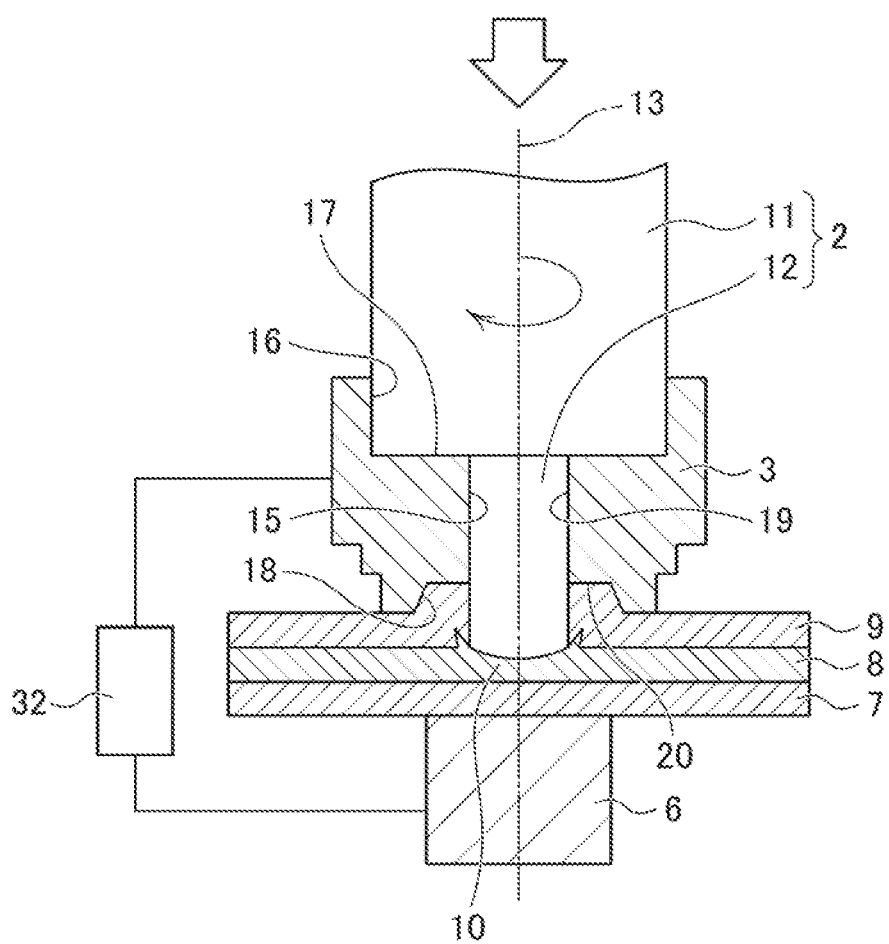
FIG. 4 is a configuration diagram illustrating the friction stir welding device according to the first embodiment of the present invention.

FIG. 1 to FIG. 4 are drawings illustrating a friction stir welding device according to a first embodiment of the present invention. FIG. 1 is a front view, partially shown in cross section. FIG. 2 is a plan view. FIG. 3 is a right side view. FIG. 4 is a configuration diagram. A friction stir welding device 1 according to the first embodiment includes a friction stir welding tool 2, a shoulder 3, a shoulder attachment member 4, a flow path 5, and a support table 6. In the first embodiment, an example will be described in which a first workpiece 7, a second workpiece 8, and a third workpiece 9 are stacked together, so as to carry out friction stir welding on a welding target part 10. In other words, in the first embodiment, the friction stir welding device 1 welds together the three plate-shaped workpieces 7, 8, and 9. However, the number of workpieces to be welded together does not necessarily have to be three and may be two or may be four or more. It is acceptable as long as the number of workpieces is two or more.

The friction stir welding tool 2 includes a shaft part 11 and a probe 12. The shaft part 11 has a substantially circular cylindrical shape. The shaft part 11 is positioned so that the axial direction thereof is perpendicular to plate faces of the workpieces 7, 8, and 9. The shaft part 11 has the probe 12 provided at an end part thereof on the side where the workpieces 7, 8, and 9 are positioned. The probe 12 is configured by using steel, ceramics, or cemented carbide. The probe 12 has a substantially circular cylindrical shape of which the diameter is smaller than that of the shaft part 11. The probe 12 is positioned on the same axial line with the shaft part 11. While rotating, the probe 12 is capable of pressing the welding target part 10 of the workpieces 7, 8, and 9. For this purpose, to the shaft part 11, a driving mechanism (not shown) is connected. Accordingly, it is possible to cause the probe 12 to move closer to and away from the workpieces 7, 8, and 9 and to cause the probe 12 to rotate on a rotation axis 13, which is the axis thereof.

The shoulder 3 is configured by using a copper alloy such as chrome copper, alumina dispersion copper, or a tungsten-copper alloy, or conductive ceramics, cemented carbide, or the like. The shoulder 3 has a substantially circular cylindrical shape. The shoulder 3 is positioned so that the axial direction thereof is perpendicular to the plate faces of the workpieces 7, 8, and 9. An inner bore 14 of the shoulder 3 is a stepped bore having a small-diameter bore 15 and a large-diameter bore 16. The small-diameter bore 15 is positioned on the side where the workpieces 7, 8, and 9 are positioned. The large-diameter bore 16 is positioned on the opposite side from the side where the workpieces 7, 8, and 9 are positioned. Accordingly, a step part 17 is provided between the small-diameter bore 15 and the large-diameter bore 16. The step part 17 is formed in the shoulder 3 so as to be indented toward the side where the workpieces 7, 8, and 9 are positioned. The small-diameter bore 15 is a stepped bore having a large-diameter bore 18 and a small-diameter bore 19. The large-diameter bore 18 is positioned on the side where the workpieces 7, 8, and 9 are positioned. The small-diameter bore 19 is positioned on the opposite side from the side where the workpieces 7, 8, and 9 are positioned. Accordingly, a step part 20 is formed between the large-diameter bore 18 and the small-diameter bore 19. The step part 20 is formed in the shoulder 3 so as to be indented toward the opposite side from the side where the workpieces 7, 8, and 9 are positioned.

As shown in FIG. 1, the friction stir welding tool 2 is inserted in the inner bore 14 of the shoulder 3. More specifically, the shaft part 11 is inserted in the large-diameter bore 16 of the shoulder 3, whereas the probe 12 is inserted in the small-diameter bore 15 of the shoulder 3. In this situation, the probe 12 penetrates the small-diameter bore 15. In other words, the tip end part of the probe 12 protrudes from the shoulder 3 to the side where the workpieces 7, 8, and 9 are positioned.

In this manner, the probe 12 is inserted in the shoulder 3. Accordingly, the shoulder 3 is provided so as to externally surround the probe 12, on a plane intersecting the rotation axis 13 of the probe 12. In other words, the probe 12 is surrounded by the shoulder 3 that is disposed radially outside with respect to the rotation axis 13 of the probe 12.

The shoulder attachment member 4 has a substantially rectangular block-like shape. The shoulder attachment member 4 has a through hole 21 that penetrates along the rotation axis 13 of the probe 12. In a planar view, the through hole 21 has a circular shape. On the inner circumferential surface 22 of the through hole 21, a recessed part 23 is formed so as to recede outwardly in a radial direction of the through hole 21. The recessed part 23 is annularly formed on the inner circumferential surface 22 of the through hole 21 along the circumferential direction of the through hole 21.

The shoulder attachment member 4 has two sideway holes 24 and 25. The sideway holes 24 and 25 are positioned apart from each other in a direction orthogonal to the rotation axis 13. The sideway holes 24 and 25 are formed in the shoulder attachment member 4 so as to allow communication between the inside and the outside of the shoulder attachment member 4. One end part, in terms of the axial direction, of the sideway hole 24 opens to the outside of the shoulder attachment member 4. The other end part, in terms of the axial direction, of the sideway hole 24 opens to the inside of the through hole 21. One end part, in terms of the axial direction, of the sideway hole 25 opens to the outside of the shoulder attachment member 4. The other end part, in terms of the axial direction, of the sideway hole 25 opens to the inside of the through hole 21. As shown in FIG. 3, an opening part 26 positioned on the one end side of the sideway hole 24 in terms of the axial direction is arranged in a position higher than an opening part 27 positioned on the one end side of the sideway hole 25 in terms of the axial direction. An opening part 28 positioned on the other end side of the sideway hole 24 in terms of the axial direction is arranged in a position lower than the opening part 26 of the sideway hole 24. Accordingly, toward the inside of the shoulder attachment member 4, the sideway hole 24 is sloped toward the side where the workpieces 7, 8, and 9 are positioned. An opening part 29 positioned on the other end side of the sideway hole 25 in terms of the axial direction is arranged at substantially the same height as the opening part 27 of the sideway hole 25.

To the shoulder attachment member 4, the driving mechanism connected to the shaft part 11 is connected. Accordingly, the driving mechanism is able to cause the shoulder attachment member 4 to move closer to and away from the workpieces 7, 8, and 9.

As shown in FIG. 1, the shoulder attachment member 4 is provided with the shoulder 3. More specifically, the shoulder 3 is provided for the shoulder attachment member 4 while being inserted in the through hole 21 of the shoulder attachment member 4. In this situation, the axial direction of the shoulder 3 coincides with the axial direction of the through hole 21. When the shoulder 3 is attached to the shoulder attachment member 4, the inner circumferential surface 22 of the through hole 21 of the shoulder attachment member 4 is annularly in contact with the outer circumferential surface 30 of the shoulder 3. While the shoulder attachment member 4 is provided with the shoulder 3, the shoulder 3 may be rotatable on the rotation axis 13 or may be fixed to the shoulder attachment member 4.

The recessed part 23 formed in the shoulder attachment member 4 is positioned, of the inner circumferential surface 22 of the through hole 21, a part that is in contact with the outer circumferential surface 30 of the shoulder 3. Accordingly, when the shoulder 3 is attached to the shoulder attachment member 4, the opening part of the recessed part 23 is closed by the outer circumferential surface 30 of the shoulder 3. As a result, an annular hollow part 31 is formed at a contact part between the outer circumferential surface 30 of the shoulder 3 and the inner circumferential surface 22 of the through hole 21 of the shoulder attachment member 4. The hollow part 31 serves as the flow path 5 through which a cooling medium is caused to flow. Due to this configuration, at the contact part between the outer circumferential surface 30 of the shoulder 3 and the inner circumferential surface 22 of the through hole 21 of the shoulder attachment member 4, the flow path 5 is realized as the recessed part 23 formed in the shoulder attachment member 4.

As shown in FIG. 2, the opening part 28 positioned on the other end side of the sideway hole 24 in terms of the axial direction is formed in a bottom part of the recessed part 23. Accordingly, the opening part 28 positioned on the other end side of the sideway hole 24 in terms of the axial direction opens into the flow path 5. As a result, while the shoulder 3 is attached to the shoulder attachment member 4, the flow path 5 and the sideway hole 24 are communicated with each other. The opening part 29 positioned on the other end side of the sideway hole 25 in terms of the axial direction is formed in the bottom part of the recessed part 23. Accordingly, the opening part 29 positioned on the other end side of the sideway hole 25 in terms of the axial direction opens into the flow path 5. As a result, while the shoulder 3 is attached to the shoulder attachment member 4, the flow path 5 and the sideway hole 25 are communicated with each other.

The support table 6 is a member supporting the workpieces 7, 8, and 9. In the extending direction of the rotation axis 13, the support table 6 is positioned so as to correspond to the probe 12. The support table 6 has connected thereto the driving mechanism connected to the shaft part 11. Accordingly, the driving mechanism is capable of causing the support table 6 to move closer to and away from the workpieces 7, 8, and 9.

As shown in FIG. 4, the friction stir welding device 1 according to the first embodiment includes a power source 32. The power source 32 is connected to the shoulder 3 and the support table 6. Accordingly, while the workpieces 7, 8, and 9 are sandwiched between the shoulder 3 and the support table 6, it is possible to cause an electric current to flow between the shoulder 3 and the support table 6. On such occasion, the shoulder 3 and the support table 6 serve as electrodes. For this reason, the shoulder 3 and the support table 6 are each formed by using a material that functions as the electrode. The shoulder 3 and the support table 6 may be formed by using mutually the same material or may be formed by using mutually-different materials.

Figure 5:
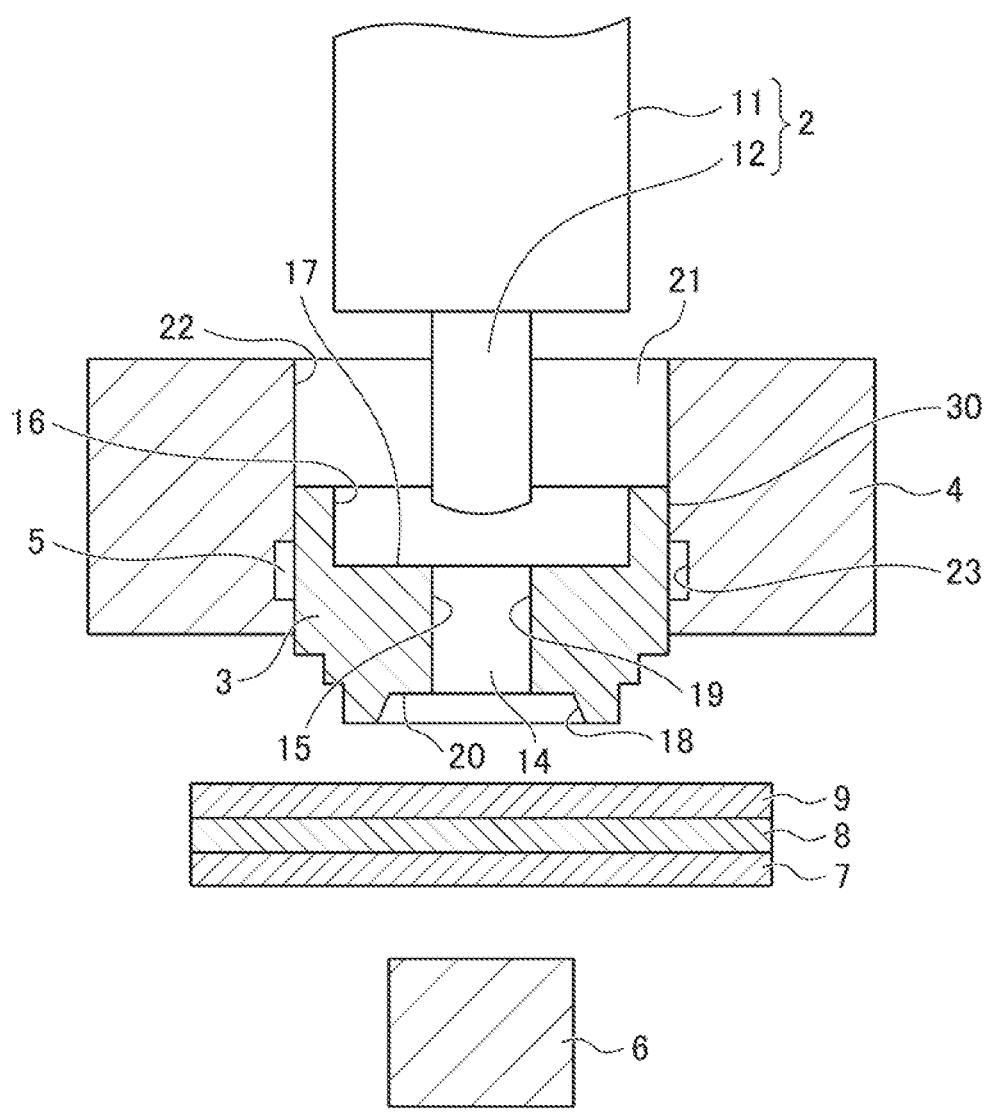
FIG. 5 is a front view illustrating a state in which the friction stir welding device according to the first embodiment of the present invention is being used, before workpieces are sandwiched between a shoulder and a support table.
Figure 6:
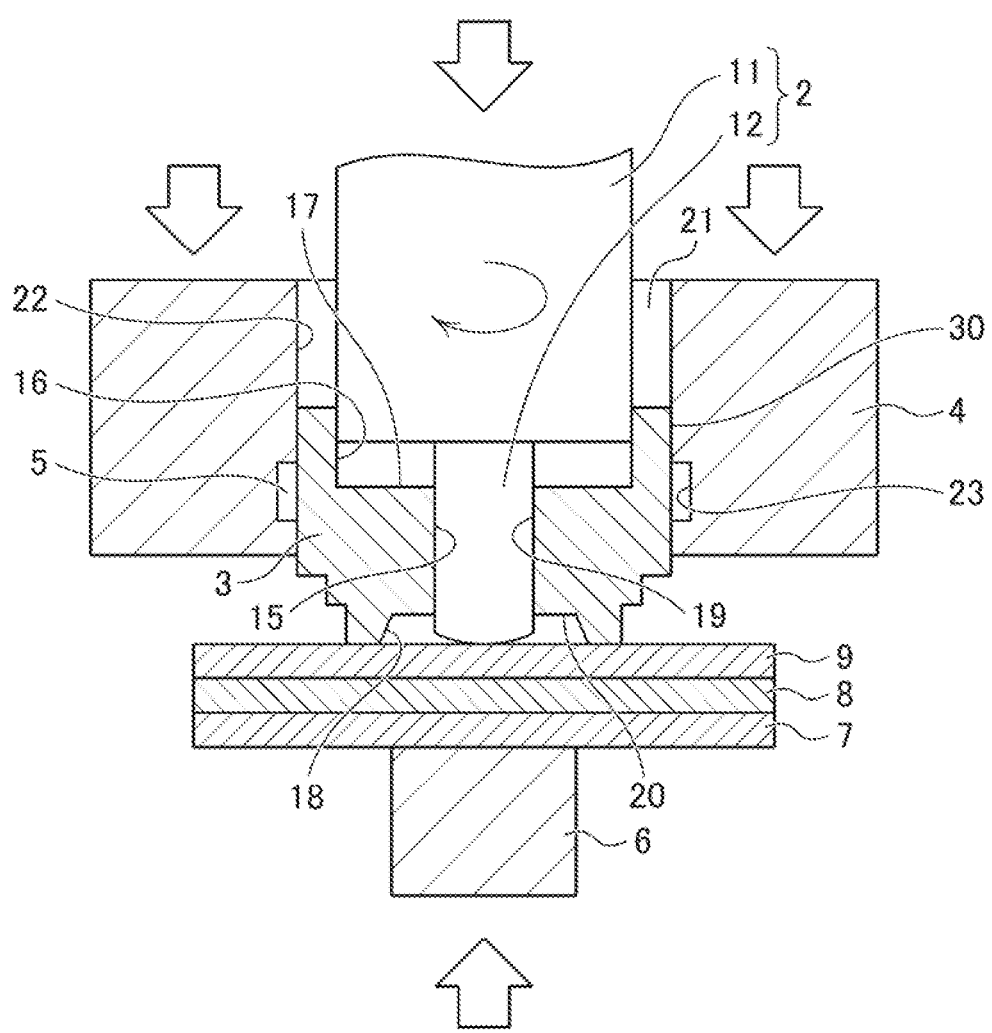
FIG. 6 is a front view illustrating another state in which the friction stir welding device according to the first embodiment of the present invention is being used and in which the workpieces are sandwiched between the shoulder and the support table.
Figure 7:
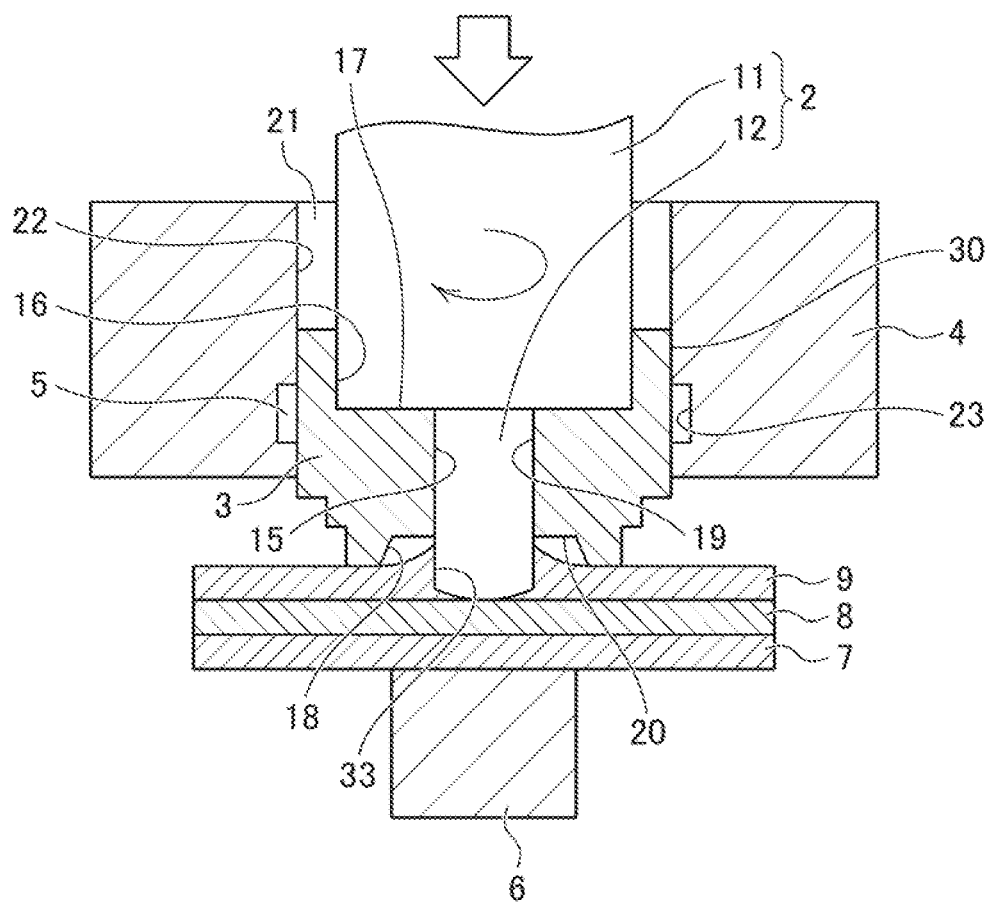
FIG. 7 is a front view illustrating yet another state in which the friction stir welding device according to the first embodiment of the present invention is being used and in which a welding process has started.
Figure 8:
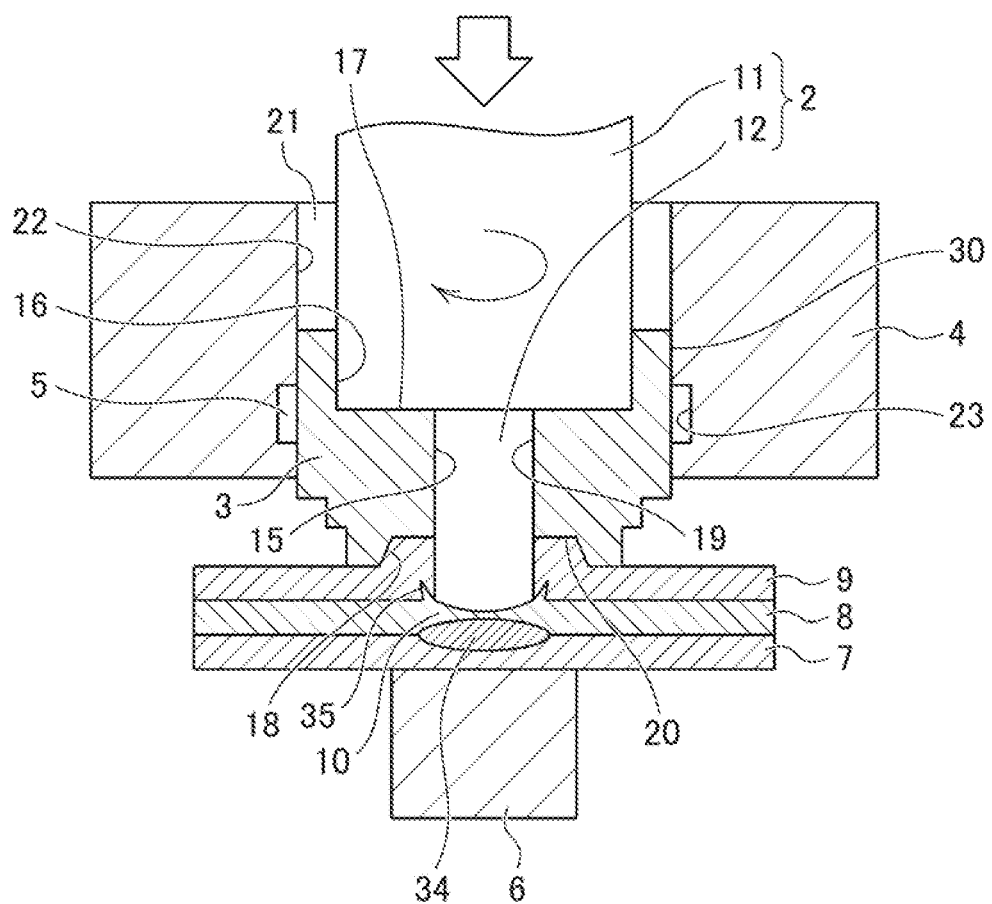
FIG. 8 is a front view illustrating yet another state in which the friction stir welding device according to the first embodiment of the present invention is being used and in which the welding process has further progressed from the state shown in FIG. 7.
Figure 9:
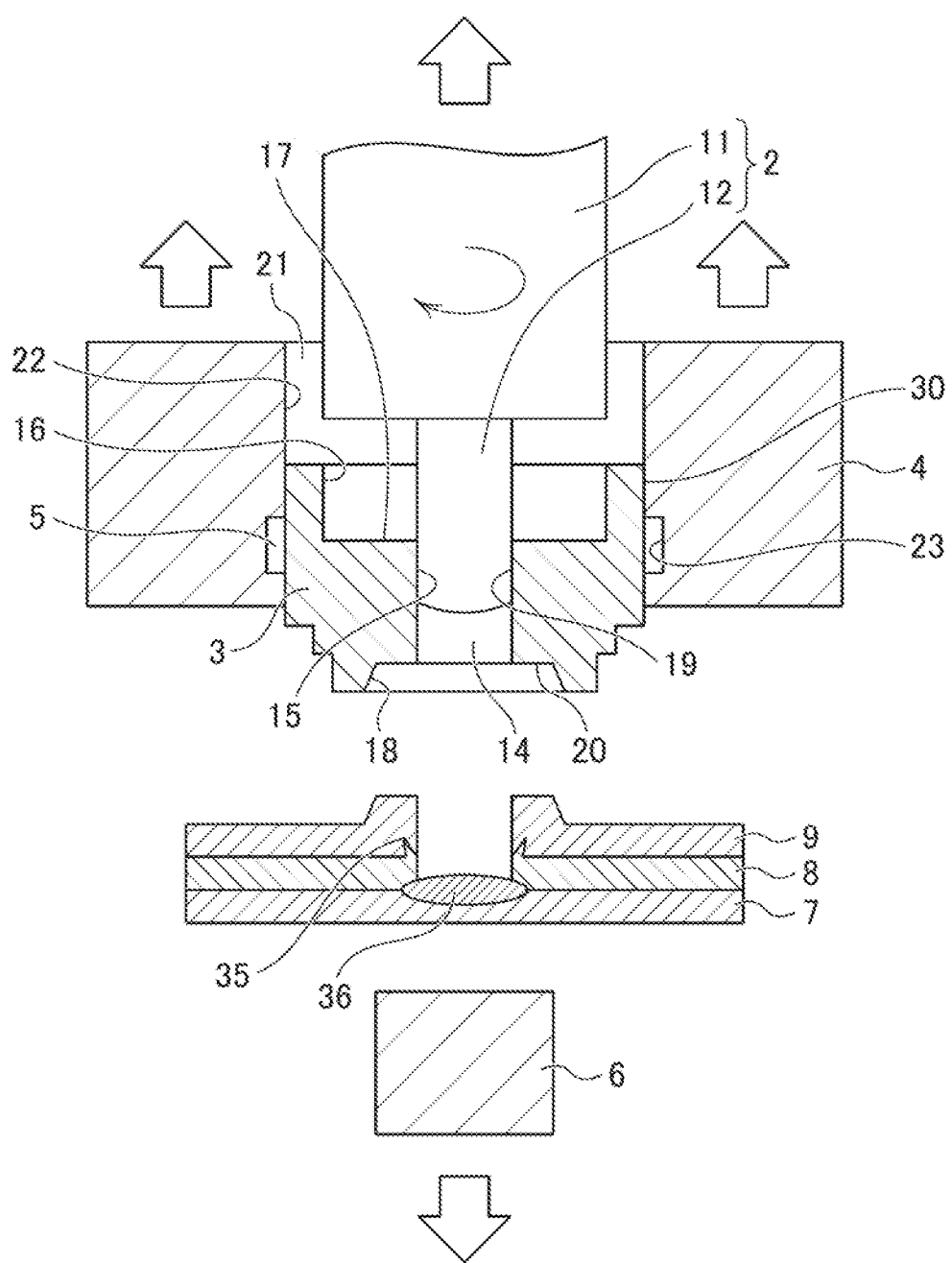
FIG. 9 is a front view illustrating yet another state in which the friction stir welding device according to the first embodiment of the present invention is being used, after the welding process.

Next, a welding process performed on the workpieces by using the friction stir welding device 1 according to the first embodiment will be described. FIG. 5 to FIG. 9 are drawings illustrating, in a time series, various states in which the friction stir welding device according to the first embodiment is being used. FIG. 5 is a front view illustrating a state in which the friction stir welding device according to the first embodiment of the present invention is being used, before the workpieces are sandwiched between the shoulder and the support table. FIG. 6 is a front view illustrating another state in which the friction stir welding device according to the first embodiment of the present invention is being used and in which the workpieces are sandwiched between the shoulder and the support table. FIG. 7 is a front view illustrating yet another state in which the friction stir welding device according to the first embodiment of the present invention is being used and in which the welding process has started. FIG. 8 is a front view illustrating yet another state in which the friction stir welding device according to the first embodiment of the present invention is being used and in which the welding process has further progressed since the state shown in FIG. 7. FIG. 9 is a front view illustrating yet another state in which the friction stir welding device according to the first embodiment of the present invention is being used, after the welding process. In FIG. 5 to FIG. 9, some parts are omitted. Also, certain parts are shown in cross section.

To weld the workpieces together, as shown in FIG. 5, the first workpiece 7, the second workpiece 8, and the third workpiece 9 which are stacked together are arranged between the support table 6 and the probe 12 with the shoulder 3. Further, as shown in FIG. 6, so as to have the workpieces 7, 8, and 9 sandwiched between the shoulder 3 and the support table 6, the driving mechanism is operated so as to move the shoulder attachment member 4 provided with the shoulder 3 and the support table 6 in the direction approaching the workpieces 7, 8, and 9. While the workpieces 7, 8, and 9 are sandwiched between the shoulder 3 and the support table 6, the workpieces 7, 8, and 9 are supported by the support table 6.

Further, the workpieces 7, 8, and 9 are pressed by the support table 6 toward the probe 12 and are also pressed by the shoulder 3 toward the support table 6. While the workpieces 7, 8, and 9 are pressed in this manner, the driving mechanism causes the probe 12 to move toward the workpieces 7, 8, and 9 while rotating on the rotation axis 13.

As shown in FIG. 7, as a result of the probe 12 moving toward the workpieces 7, 8, and 9 while rotating, the tip end part of the probe 12 thrusts into the third workpiece 9. As a result, a hole 33 is formed in the third workpiece 9. As a result of the hole 33 being formed in the third workpiece 9, a part of the third workpiece 9 is pushed away by the probe 12. The part pushed away by the probe 12 enters the large-diameter bore 18 of the shoulder 3. The third workpiece 9 has a plastic flow due to friction heat caused by the rotation of the probe 12. As a result, in the vicinity of the probe 12, a flow regime having an annular shape in a planar view or having a circular shape in a planar view is formed in the third workpiece 9.

When the tip end part of the probe 12 has reached the second workpiece 8, an electric current is caused to flow between the shoulder 3 and the support table 6. As shown in FIG. 8, while the electric current is flowing between the shoulder 3 and the support table 6, the probe 12 is advanced toward the support table 6 while rotating. As a result, the tip end part of the probe 12 is caused to thrust into the second workpiece 8.

Due to the electric current being caused to flow between the shoulder 3 and the support table 6, a melted part 34 is formed between the first workpiece 7 and the second workpiece 8 by resistance heat from the first workpiece 7 and the second workpiece 8 and by friction heat caused by the rotation of the probe 12. Further, the second workpiece 8 has a plastic flow in the vicinity of the probe 12. For this reason, a part of the second workpiece 8 pushed away by the probe 12 thrusts into the third workpiece 9 along the probe 12. At that time, the longer the distance from the probe 12 is, the lower is fluidity because the temperature is lower. Thus, the part of the second workpiece 8 that thrusted into the third workpiece 9 is pushed out toward the outside in the radial direction of the probe 12. Accordingly, in the vicinity of the probe 12, the second workpiece 8 has formed thereon a hook 35 which extends outwardly in the radial direction of the probe 12, as approaching the shaft part 11.

After that, the operation of causing the electric current to flow between the shoulder 3 and the support table 6 is stopped. Further, as shown in FIG. 9, while rotating, the probe 12 retreats in the direction moving away from the workpieces 7, 8, and 9. In addition, the support table 6 and the shoulder 3 stop applying pressure to the workpieces 7, 8, and 9. Further, the shoulder 3 and the support table 6 retreat in the direction moving away from the workpieces 7, 8, and 9. After the electric current has stopped, and the probe 12 has moved away from the workpieces 7, 8, and 9, the melted part 34 solidifies so that a nugget 36 is formed. As a result, the first workpiece 7 and the second workpiece 8 are welded with each other. Further, because the hook 35 was formed as described above, the third workpiece 9 and the second workpiece 8 are welded with each other. In this manner, the friction stir welding device 1 is able to weld the three workpieces 7, 8, and 9 together.

When performing the friction stir welding process on the three workpieces 7, 8, and 9, the friction stir welding device 1 according to the first embodiment is configured so that the cooling medium is caused to flow through the flow path 5. From the opening part 26 provided on the one end side of the sideway hole 24 in terms of the axial direction, the cooling medium is caused to flow through the flow path 5 via the sideway hole 24. Further, from the opening part 27 provided on the one end side of the sideway hole 25 in terms of the axial direction, the cooling medium that flowed through the flow path 5 is discharged to the outside of the flow path 5, via the sideway hole 25. The flow of the cooling medium as described above is realized as a result of the cooling medium being circulated by a pump. In this situation, the cooling medium is not particularly limited and may be water, for example.

The cooling medium may be caused to start flowing through the flow path 5, before the friction stir welding device 1 starts performing the friction stir welding process or after the friction stir welding device 1 starts performing the friction stir welding process. In other words, it is acceptable to cause the cooling medium to start flowing through the flow path 5 before the tip end part of the rotating probe 12 comes into contact with the third workpiece 9, and it is also acceptable to cause the cooling medium to start flowing through the flow path 5 after the tip end part of the rotating probe 12 comes into contact with the third workpiece 9. While the friction stir welding process is performed by the friction stir welding device 1, the cooling medium is caused to flow through the flow path 5. Further, as shown in FIG. 9, when the friction stir welding process performed by the friction stir welding device 1 has finished, the operation to cause the cooling medium to flow through the flow path 5 is stopped.

In the example with the friction stir welding device 1 according to the first embodiment, the flow path 5 is formed at the contact part between the shoulder 3 and the shoulder attachment member 4. Accordingly, causing the cooling medium to flow through the flow path 5 makes it possible to prevent the shoulder 3 from getting heated excessively. Consequently, it is possible to prevent the shoulder 3 and the workpiece 9 from adhering to each other.

In the example with the friction stir welding device 1 according to the first embodiment, the recessed part 23 is formed in the shoulder attachment member 4. Accordingly, it is possible to simplify the shape of the shoulder 3, which makes it easy to form the shoulder 3.

In the example with the friction stir welding device 1 according to the first embodiment, it is possible to cause the electric current to flow between the shoulder 3 and the support table 6. When the electric current is caused to flow between the shoulder 3 and the support table 6 in this manner, the workpieces 7, 8, and 9 become heated easily. Accordingly, by forming the flow path 5 for the cooling medium, it is possible to achieve a larger advantageous effect of inhibiting the workpieces 7, 8, and 9 and the shoulder 3 from adhering to each other.

In the example with the friction stir welding device 1 according to the first embodiment, the cooling medium is supplied to the flow path 5 from the sideway hole 24. Further, via the sideway hole 25, the cooling medium is discharged from the flow path 5 to the outside of the flow path 5. Accordingly, with the example of the friction stir welding device 1 according to the first embodiment, the inlet of the flow path 5 is positioned higher than the outlet of the flow path 5. Consequently, it is possible to smoothly supply the cooling medium to the inside of the flow path 5, and it is therefore possible to further enhance the cooling effect.

Figure 10:
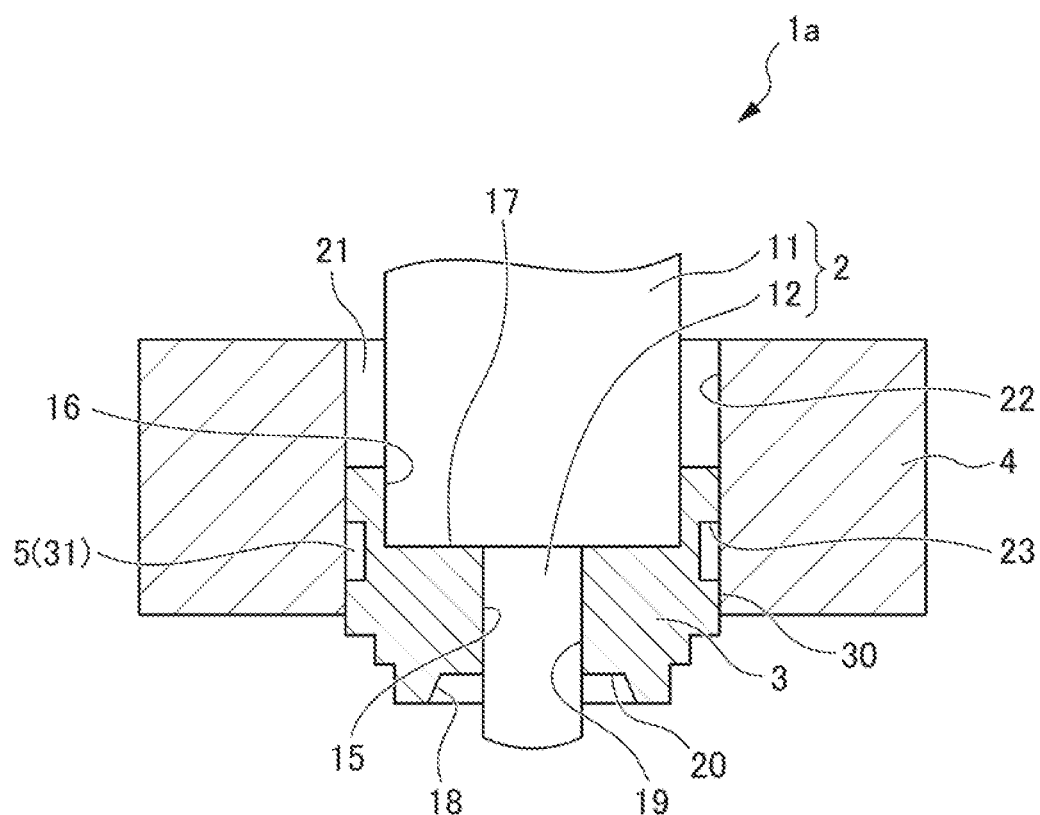
FIG. 10 is a front view illustrating a friction stir welding device according to a second embodiment of the present invention, partially shown in cross section.
Figure 11:
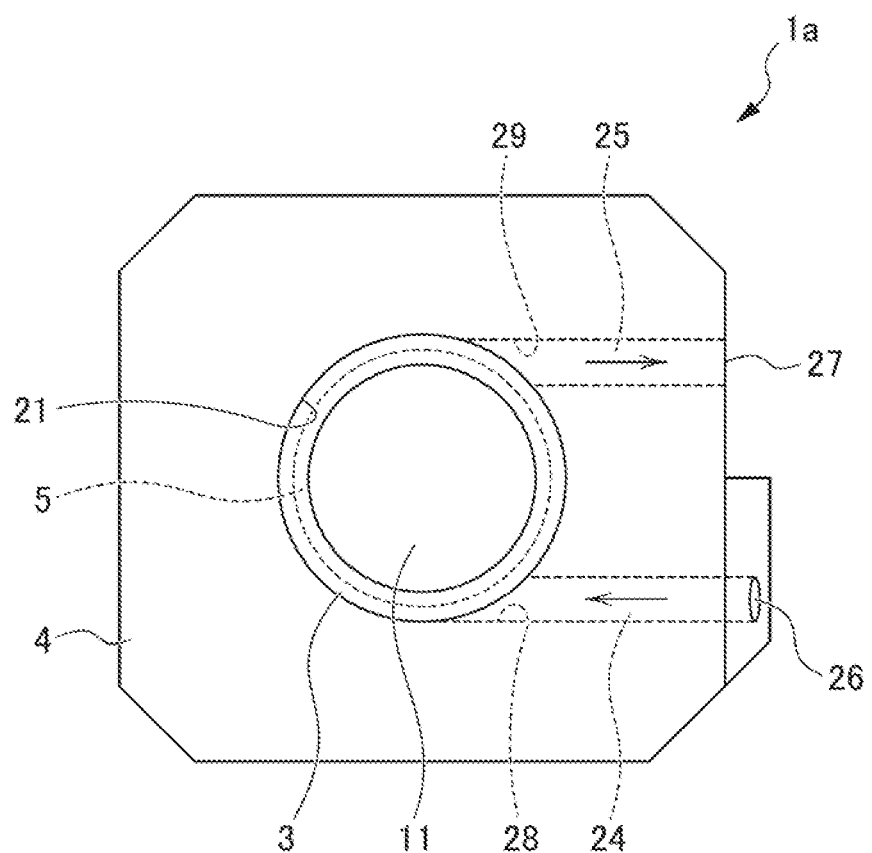
FIG. 11 is a plan view illustrating the friction stir welding device according to the second embodiment of the present invention.

Next, a friction stir welding device 1a according to a second embodiment of the present invention will be described. FIG. 10 and FIG. 11 are drawings illustrating the friction stir welding device according to the second embodiment of the present invention. FIG. 10 is a front view partially shown in cross section. FIG. 11 is a plan view. Further, in the second embodiment, characteristic parts thereof will be described, and a description of the features that have been described in the first embodiment will be omitted.

In the second embodiment, the configuration of the flow path 5 is different from that in the first embodiment described above. More specifically, in the friction stir welding device 1a according to the second embodiment, a recessed part 23 is formed in the shoulder 3. On the outer circumferential surface 30 of the shoulder 3, the recessed part 23 is formed so as to recede inwardly in the radial direction of the shoulder 3. The recessed part 23 is annularly formed along the circumferential direction of the outer circumferential surface 30 of the shoulder 3.

Of the outer circumferential surface 30 of the shoulder 3, the recessed part 23 formed in the shoulder 3 is positioned in a part that is in contact with the inner circumferential surface 22 of the shoulder attachment member 4. Accordingly, when the shoulder 3 is attached to the shoulder attachment member 4, the opening part of the recessed part 23 is closed by the inner circumferential surface 22 of the shoulder attachment member 4. As a result, at the contact part between the outer circumferential surface 30 of the shoulder 3 and the inner circumferential surface 22 of the through hole 21 in the shoulder attachment member 4, an annular hollow part 31 is formed. The hollow part 31 serves as the flow path 5. In this configuration, the flow path 5 is the recessed part 23 formed in the shoulder 3, at the contact part between the outer circumferential surface 30 of the shoulder 3 and the inner circumferential surface 22 of the through hole 21 of the shoulder attachment member 4.

As described above, because the recessed part 23 is formed in the shoulder 3, the configurations of the sideway holes 24 and 25 are also different from those in the first embodiment. More specifically, the opening part 28 positioned on the other end side of the sideway hole 24 in terms of the axial direction and the opening part 29 positioned on the other end side of the sideway hole 25 in terms of the axial direction are formed on the inner circumferential surface 22 of the shoulder attachment member 4. As a result, the sideway hole 24 and the sideway hole 25 are communicated with the flow path 5.

In the example of the friction stir welding device 1a according to the second embodiment, the recessed part 23 is formed in the shoulder 3. Consequently, it is possible to enhance the cooling effect because the cooling medium flowing through the flow path 5 and the shoulder 3 have a large contact part.

Figure 12:
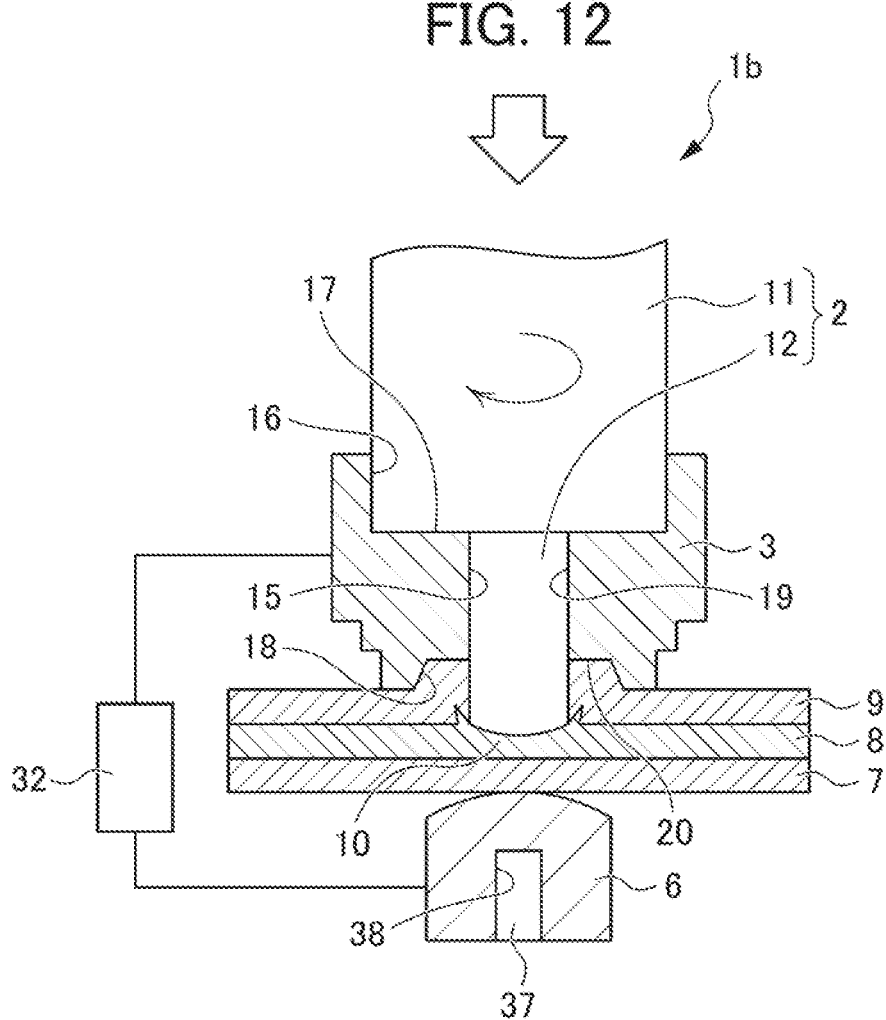
FIG. 12 is a configuration diagram illustrating a first modification example of a friction stir welding device of the present invention.

Next, a first modification example of a friction stir welding device of the present invention will be described. FIG. 12 is a configuration diagram illustrating the first modification example of the friction stir welding device of the present invention. In the first modification example, characteristic parts thereof will be described, and a description of the features that have been in the first embodiment will be omitted.

In the first modification example, the configuration of the support table 6 is different from that in the first embodiment. More specifically, the support table 6 has a curved surface for supporting the workpieces 7, 8, and 9. The surface that supports the workpieces 7, 8, and 9 is the curved surface concave toward the workpieces 7, 8, and 9.

Further, the support table 6 has a cooling medium path 37 through which a cooling medium to cool the support table 6 is caused to flow. The cooling medium path 37 is configured to cool a part of the support table 6 corresponding to the probe 12. For example, the cooling medium path 37 has a vertical hole 38 that opens at the bottom and a plurality of sideway holes (not shown) that are communicated with the vertical hole 38. In a position corresponding to the probe 12, the vertical hole 38 is formed in the support table 6 so as to open at the bottom. The plurality of sideway holes are formed in the support table 6 in a radial pattern in a planar view. The opening part of each of the sideway holes on one end side in terms of the axial direction is formed in an outer lateral face of the support table 6. The opening part of each of the sideway holes on the other end side in terms of the axial direction is formed in the inner face of the vertical hole 38. In this situation, the cooling medium is not particularly limited and may be water, for example.

The cooling medium is supplied to the inside of the vertical hole 38 through the opening part at the bottom of the vertical hole 38 and is discharged to the outside of the support table 6 through the sideway holes. The flow of the cooling medium as described above is realized as a result of the cooling medium being circulated by a pump.

In the example with a friction stir welding device 1b according to the first modification example, the support table 6 has the curved surface for supporting the workpieces 7, 8, and 9. Consequently, it is possible to cause the electric current to flow between the shoulder 3 and the support table 6 stably.

In the example with the friction stir welding device 1b according to the first modification example, the cooling medium path 37 formed in the support table 6 is configured so as to cool the part of the support table 6 corresponding to the probe 12. Consequently, it is possible to prevent the support table 6 and the workpiece 7 from adhering to each other.

Figure 13:
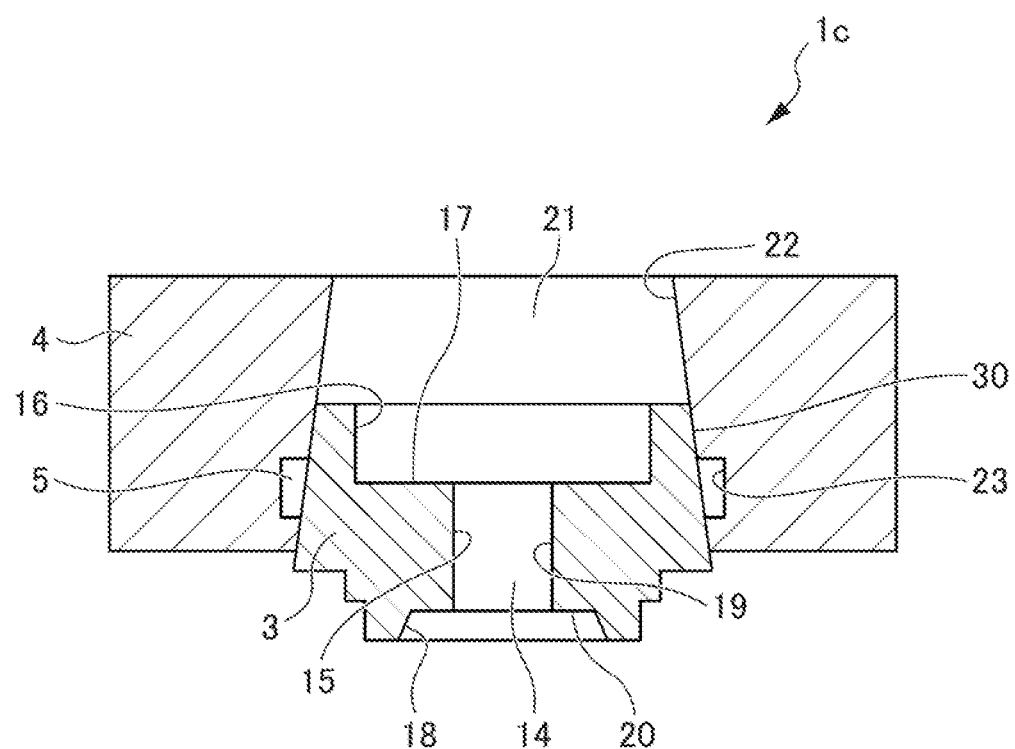
FIG. 13 is a front view illustrating a second modification example of a friction stir welding device of the present invention, partially shown in cross section.

Next, a second modification example of a friction stir welding device of the present invention will be described. FIG. 13 is a front view illustrating the second modification example of the friction stir welding device of the present invention, partially shown in cross section. In the second modification example, characteristic parts thereof will be described, and a description of the features that have been described in the first embodiment will be omitted.

In the second modification example, the configurations of the shoulder 3 and the shoulder attachment member 4 are different from those in the first embodiment. More specifically, at the contact part between the shoulder 3 and the shoulder attachment member 4, the shoulder 3 and the shoulder attachment member 4 are in tapered contact. In the example shown, the outer circumferential surface 30 of the shoulder 3 is formed as a tapered surface, so that the diameter becomes smaller in the direction moving away from the workpieces 7, 8, and 9 along the rotation axis 13. The inner circumferential surface 22 of the shoulder attachment member 4 is formed as a tapered surface, so that the diameter becomes smaller in the direction moving away from the workpieces 7, 8, and 9 along the rotation axis 13. The inner circumferential surface 22 of the shoulder attachment member 4 is formed as the tapered surface corresponding to the outer circumferential surface 30 of the shoulder 3. With this configuration, when the shoulder 3 is attached to the shoulder attachment member 4, the outer circumferential surface 30 of the shoulder 3 is in contact with the inner circumferential surface 22 of the shoulder attachment member 4. Consequently, the shoulder 3 and the shoulder attachment member 4 are in tapered contact. Alternatively, the outer circumferential surface 30 of the shoulder 3 and the inner circumferential surface 22 of the shoulder attachment member 4 may each be formed as a tapered surface so that the diameter becomes larger in the direction moving away from the workpieces 7, 8, and 9 along the rotation axis 13.

In the example with the friction stir welding device 1c according to the second modification example, the shoulder 3 and the shoulder attachment member 4 are configured to make the tapered contact. Consequently, it is possible to enhance watertightness of the flow path 5 that is formed as a result of the opening part of the recessed part 23 being closed with the outer circumferential surface 30 of the shoulder 3.

Further, the present invention is not limited to the embodiments and the modification examples described above. As long as the object of the present invention is achieved, modifications and improvements are considered as a part of the present invention.

For example, in the second embodiment in which the recessed part 23 is formed in the shoulder 3, the support table 6 may be configured as described in the first modification example. Further, in the second embodiment in which the recessed part 23 is formed in the shoulder 3, the shoulder 3 and the shoulder attachment member 4 may be configured as described in the second modification example. Furthermore, although the inner bore 14 of the shoulder 3 was described as the stepped bore having the small-diameter bore 15 and the large-diameter bore 16, the inner bore 14 may be a bore having a constant inside diameter, for example.

EXPLANATION OF REFERENCE NUMERALS

1: FRICTION STIR WELDING DEVICE
3: SHOULDER
4: SHOULDER ATTACHMENT MEMBER
5: FLOW PATH
6: SUPPORT TABLE
7: FIRST WORKPIECE
8: SECOND WORKPIECE
9: THIRD WORKPIECE
10: WELDING TARGET PART
12: PROBE
13: ROTATION AXIS
23: RECESSED PART
31: HOLLOW PART
37: COOLING MEDIUM PATH

What is claimed is:

1. A friction stir welding device comprising:
   a probe capable of pressing a welding target part of a workpiece while rotating;
   a shoulder externally surrounding the probe, on a plane intersecting a rotation axis of the probe;
   a shoulder attachment member provided with the shoulder; and
   a flow path formed at a contact part between the shoulder and the shoulder attachment member and adapted to allow a cooling medium to flow therethrough,
   wherein
   the flow path is a recessed part formed in the shoulder at the contact part between the shoulder and the shoulder attachment member.

2. The friction stir welding device according to claim 1, wherein the shoulder and the shoulder attachment member are in tapered contact at the contact part between the shoulder and the shoulder attachment member.

3. The friction stir welding device according to claim 1, wherein an inlet of the flow path is positioned higher than an outlet of the flow path.

4. The friction stir welding device according to claim 1, further comprising:
   a support table configured to support the workpiece, wherein
   in a state in which the workpiece is sandwiched between the shoulder and the support table, the shoulder and the support table serve as electrodes, and an electric current is caused to flow between the shoulder and the support table.

5. The friction stir welding device according to claim 4, wherein
   the support table has a curved surface for supporting the workpiece and has a cooling medium path through which a cooling medium for cooling the support table is caused to flow, and
   the cooling medium path is configured so as to cool a part of the support table corresponding to the probe.

* * * * *